(No Model.)
W. COURTENAY.
Screw Nut.
No. 240,892.   Patented May 3, 1881.
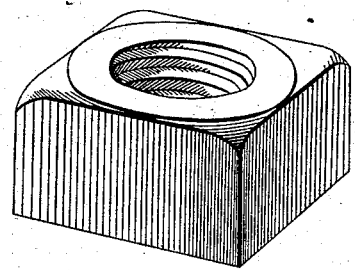
Witnesses.
Henry F. Parker
Henry Dent
Inventor.
William Courtenay
by Wyllys Hodges
Atty.

UNITED STATES PATENT OFFICE.

WILLIAM COURTENAY, OF NEW YORK, N. Y.

SCREW-NUT.

SPECIFICATION forming part of Letters Patent No. 240,892, dated May 3, 1881.

Application filed December 9, 1880. (No model.)

*To all whom it may concern:*

Be it known that I, WILLIAM COURTENAY, of the city, county, and State of New York, have invented a certain new and useful Improvement in Screw-Nuts, intended, primarily, for use as a jam-nut, but which may also be used as a main or common nut in some places where such a nut is desired.

The nut is shown in perspective in the drawing, and is in shape and construction like an ordinary screw-nut, but differs from it in that it is made of the material known as "vulcanized fiber," being paper or other vegetable fiber treated with muriatic, sulphuric, or nitric acid, or with a salt of those acids, in a manner well known to the trade.

The nut so constructed is, primarily, intended to be used as an auxiliary or jam nut, to be screwed down over the main nut, or under it, and between it and the bearing-surface, and owing to the peculiar properties of the material will, when so used, operate to hold the main nut firmly in position and to deaden the vibration, which tends to loosen it. It may, however, be used to a certain extent alone as a screw-nut, and will be found to have qualities which adapt it to use in many places where a metallic or other nut would imperfectly answer the purpose. For example, in some parts of operative machinery, where no great strain is brought upon the nuts, the absorption of vibration of which the material is capable will render it very useful in deadening the jar of the machinery and saving it from wear, as well as contributing to the permanence of the nut. It will in some instances be found to be capable of use alone, where heretofore it has been necessary to place a spring-washer under the nut. With this quality of deadening vibration the material combines a certain amount of strength, hardness, and peculiar frictional properties which highly adapt such a nut to many special uses.

I am aware that jam-nuts have been before made of rubber, but mine differ from these in the following particulars: In their strength and toughness, and, in fact, that their gripe upon the bolt may be relied upon to be produced by their swelling from the imbibing of moisture, whereas rubber jam-nuts have usually produced this gripe by the elasticity of the material, the bore of the nut being smaller than the bolt. This is unnecessary when such a nut is constructed of vulcanized fiber, although it may be done, if desired, or the bore may be slightly conical, the outer end being smaller than the bolt, as the nature of the material will permit the bolt to cut its own thread in the nut without injury to the latter or to itself.

What I claim is—

A screw-nut made of vulcanized fiber, adapted to be used, if desired, as a jam-nut, substantially as and in the manner described.

WILLIAM COURTENAY.

Witnesses:
ALBERT C. AUBERY,
HENRY DENT.